Aug. 19, 1958     D. P. MUDD     2,848,258
ATTACHMENT DEVICE
Filed May 17, 1954
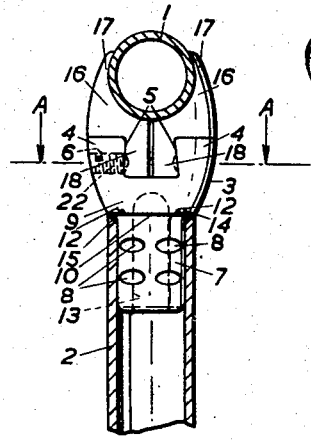
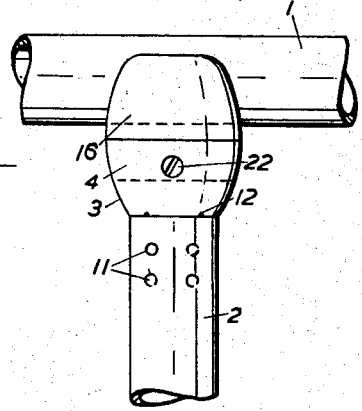
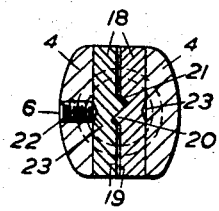
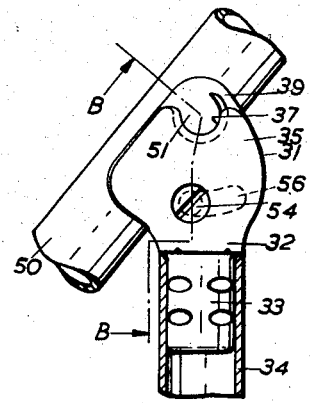
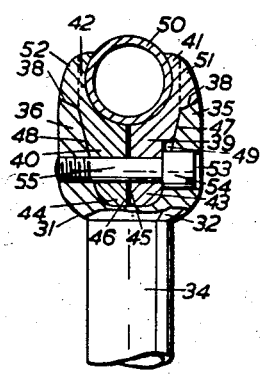
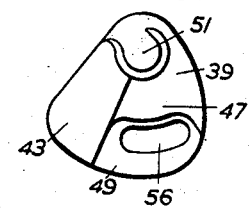
Inventor:
Derek Percival Mudd
By Ahlberg, Nupper & Gradolph
Attorneys.

United States Patent Office 2,848,258
Patented Aug. 19, 1958

2,848,258

ATTACHMENT DEVICE

Derek Percival Mudd, Guisborough, England

Application May 17, 1954, Serial No. 430,348

Claims priority, application Great Britain November 13, 1953

6 Claims. (Cl. 287—54)

This invention relates to devices or fittings for attaching one member to another and it has for its principal object the provision of an improved fitting for this purpose. The invention is more particularly concerned with the provision of such a fitting for use in the construction of a handrail, guardrail or the like (hereinafter referred to generally as a "railing") and it has amongst its objects the provision of a fitting for attaching the top rail of such a railing to the standards or uprights supporting it. A further object of the invention is the provision of such a fitting which does not provide any obstruction or projection on the upper surface of the top rail.

In the case of railings which are arranged horizontally such as along the edges of horizontal platforms, landings and the like, the top rail will normally be at right angles to the standards or uprights and the invention, in one of its aspects, provides fixed fittings designed for use in such cases.

When, however, a railing is required for a stairway, ramp or the like which is not horizontal the top rail requires to be connected at an angle other than a right angle with the uprights or standards and this angle may be different in different constructions, depending on the angle or slope of the stairway, ramp or the like.

It is, accordingly, a further object of the invention to provide an adjustable fitting by means of which the top rail may be connected with an upright at an angle which is adjustable within suitable limits.

According to the invention a fitting is provided for connecting a cross member to another member comprising a fork element which is adapted to be connected to the second said member and which includes a pair of arms spaced from each other, a pair of jaw elements which fit between the arms and which are adapted to engage at least partly round the cross member to hold the latter and means for retaining the jaw elements between the arms in position to secure the cross member.

In the case of a fixed or non-adjustable fitting, the fitting is so constructed that when it is assembled the jaw elements are held against angular movement relatively to the arms of the fitting. In the case, however, of an adjustable fitting, the construction is such that the jaw elements are allowed angular movement relatively to the arms of the fitting so that the angle between the said members may be varied.

For the better understanding of the invention one embodiment of a non-adjustable fitting and one of an adjustable fitting will now be described, by way of example. Reference will be had to the accompanying drawing, in which:

Figure 1 is a side view, partly in section, showing a non-adjustable fitting;

Figure 2 is a front elevational view of the fitting shown in Figure 1;

Figure 3 is a section of the fitting taken on the line A—A of Figure 1;

Figure 4 is a front elevational view, partly in section, showing an adjustable fitting;

Figure 5 is a section taken on the line B—B of Figure 4;

Figure 6 is a front view showing part of the fitting of Figures 4 and 5.

Referring to Figures 1 to 3, the fitting shown is intended to be used for connecting a tubular or other handrail 1, of circular section, with a tubular upright or standard 2, also of circular section. The fitting comprises a fork element or connecting head 3 the upper part of which includes a pair of arms 4. The inner faces of these arms are inclined inwardly towards each other, as shown in Figure 1, so that the channel formed between the arms is of dovetail section. A tapped hole 6 is formed through one of the arms 4.

The fork element 3 includes at its lower end a dowel 7 which is intended to fit into the upper end of the standard or stanchion 2. This dowel 7 is formed with a plurality of depressions 8 which are spaced longitudinally and circumferentially on it, as shown, and it meets the body portion 9 of the element 3 in a step or shoulder 10 which rests on the end of the standard 2.

It is intended that the standard 2 should be secured to the dowel 7 by punching the walls of the standard, as indicated at 11 in Figure 2, so as to produce internal projections which engage in the depressions 8 in a manner similar to that described in the specification of my application No. 413,596, filed March 2, 1954, now abandoned. To this end the depressions 8, each of which extends only partly round the dowel 7, are preferably made of elongated form with their longer axes arranged circumferentially of the dowel and the depth of the depressions is made a maximum near their centres, decreasing towards their ends, for the reasons mentioned in the said specification.

Furthermore, the shoulder 10 is preferably provided with guide marks 12 which are aligned longitudinally with the depressions 8 so as to indicate the positions of the latter circumferentially of the dowel 7 when the depressions are covered by the end of the standard 2. This enables the positions at which the punch marks 11 are to be made in the standard 2 to be determined in the circumferential direction. In order that the longitudinal distances from the end of the standard of the correct positions for the punch marks may be ascertained, the depressions 8 are formed in the dowel 7 at such distances from the shoulder 10 that the distance between the centre of each depression and the shoulder is a standard distance (such as half an inch or one centimetre) or an exact multiple of this standard distance.

The fork element 3 may be formed with an internal bore 13, if desired, or this bore may be omitted. In this connection it may be noted that in the case of fittings made of a soft or malleable metal, it might be advisable to omit the bore 13 or, alternatively, to fill it with a plug, in order to ensure that the dowel 7 will withstand the punching operation without risk of it being deformed.

For reasons of strength it is preferred that the angle 14 where the dowel portion 7 meets the shoulder 10 should be slightly rounded, since it is difficult to make a sharp angle at this point by casting and such an angle tends to weaken the part. In order that the standard 2 may fit closely against the step 10 the upper end of the standard is chamfered internally as shown at 15.

The fitting also comprises a pair of jaw elements 16 each of which includes an upper jaw part 17 and a lower tongue part 18. The jaw parts 17 are shaped as shown so as to provide between them a channel of part-circular section adapted to receive the top rail 1. The jaws embrace the rail 1 round more than half its circumference but do not extend completely over the top of the rail.

The tongue parts 18 are so shaped that together they fill the dovetail-sectioned channel between the arms 4, The abutting faces 19 of the tongue parts 18 are formed with interlocking vertical ribs and grooves 20 and 21, as shown in Figure 3. The construction of the jaw elements 16 is thus such that, when fitted together in the manner shown, they can be slid into the dovetail channel in the fork element 3, but when in position in the latter one jaw element cannot be moved relatively to the other. The jaw elements can thus both be locked in position by means of a single grub screw 22 (preferably of the self-locking type) which is screwed into the tapped hole 6 until its pointed end engages in a conical identation 23 in the correspond fork element 16.

For the sake of interchangeability both the jaw elements 16 are preferably formed with such identations 23, but with the construction shown only one grub screw is necessary to lock the fitting. It would, however, be possible, as an alternative, to make use of a pair of grub screws, one screwed through each of the arms 4 into the corresponding identation 23. In this case the ribs and grooves 20 and 21 can be omitted.

In order to assemble the railing the fitting is secured to the top of the standard 2 by inserting the dowel 7 into the latter and by then punching the walls of the standard in positions corresponding to the depressions 8 in order to form internal projections in the standard, which engage in the depressions in the manner described in the aforesaid specifications. When this has been done the jaw elements 16 are fitted so as to embrace the rail 1 at a point close to, but spaced from, their final positions on the rail. The elements 16 are then slid longitudinally along the rail into their final positions between the arms 4 of the fork element 3, where they are secured by means of the grub screw 22.

It will be seen that by using the fitting of the invention the cross rail 1 can be secured to the standard 2 without its end having to be passed through any part of the fitting, while once the jaw elements 16 have been locked in position by the grub screw 22 the rail 1 is firmly held against any lifting or sideways force. Such a force is resisted not only by the grub screw 22 but also by the engagement of the faces of the tongue parts 18 against the inclined faces 5 of the arms 4.

Should it be desired to dismantle the railing this can easily be done simply by loosening the grub screw 22 and by then sliding the jaw elements 16 along the rail 1 until they are clear of the fork element 3.

If it is desired to lock the railing 1 against sliding movement between the jaw elements 16, this can be done by punching an identation (not shown) in one or each of the jaws 17 so as to form a dimple biting into the rail.

Referring now to Figures 4 to 6, the adjustable fitting shown comprises a fork element 31 having a body part 32 and a dowel 33. This dowel is constructed and mounted in the upper end of a standard 34 in an exactly similar manner to the dowel 7 of the fitting described with reference to Figures 1 to 3.

The upper part of the fork element 31 is shaped as shown in the drawing to provide a pair of spaced-apart side arms 35 and 36, the upper ends of which are shaped to provide recesses or sockets 37 which are of substantially semi-circular shape when viewed from the front, as shown in Figure 4. The walls of the sockets preferably slope inwardly, as shown in Figure 5, so that the sockets are of part-conical shape.

For fitting between the arms 35 and 36 two jaw elements 39 and 40 are provided, each of which includes an upper jaw part 41 or 42 and a lower tongue part 43 or 44. The inner faces 45 and 46 of the tongues 43 and 44 are parallel, as shown in Figure 5, but their outer surfaces 47 and 48 are inclined to conform substantially to the inner faces of the arms 35 and 36, except that, in the case of the tongue 43, the face 47 is cut-away as shown so as to provide a plane surface 49 which is parallel to the face 45 of the tongue 43.

The jaws 41 and 42 are shaped to provide between them a part-circular recess adapted to receive a circular cross rail 50 which is engaged around more than half its circumference by the jaws. The jaws are also formed externally with part-conical projections 51 and 52 which are shaped as shown in the drawing so as to engage in the sockets 37 to provide a pivotal connection between the jaw elements 39 and 40 and the fork element 31.

The arm 35 of the fork element 31 is formed with a smooth bore 53 which is adapted to admit the head 54 of a cheese-headed bolt 53. This bolt passes through arcuate slots 56 formed in the tongues 43 and 44 and is screwed into a tapped hole in the arm 36.

The fitting is assembled in a manner which is analogous to that which has been described for the non-adjustable fitting of Figures 1 to 3. The jaw elements 39 and 40, after being removed from the fork element 31 by the removal of the bolt 55, are fitted on the hand-rail 50 and are then slid along the latter until they are in position between the arms 35 and 36 of the fork element 31. The parts are then locked in position by inserting and tightening the bolt 55, it being noted that the pressure of the head 54 of the bolt on the surface of the jaw element 39 has the effect of pressing the jaw elements together so as to grip the rail 50. The rail is thus firmly held without the need for any other locking means.

The fittings which have been described may be made of any suitable materials such as, for example, cast malleable iron, steel, bronze, aluminium or an aluminium alloy.

I claim:

1. A fitting for releasably connecting the medial portion of a rail to an adjacent structural part, comprising, in combination, a head having a connector integral therewith and extending rigidly from one end thereof, said head defining therein an elongated slot extending thereacross between two arms rigid with the head and forming integral parts thereof, one longitudinal side of said slot being open along the length thereof away from said connector, a pair of opposed rail embracing jaws having two opposed tongues integrally formed on the respective jaws and shaped to fit slidably into said slot in opposed relation to each other, substantially every portion of one tongue and the opposing portion of the other tongue having a combined transverse thickness substantially equal to the corresponding transverse width of the slot, said respective jaws including two rail gripping portions integral with said respective tongues and projecting from said open longitudinal side of said slot, said rail gripping portions projecting from said slot opposing each other across a plane parallel to the slot and having rail embracing extreme ends curving toward each other, said rail gripping portions being shaped inwardly of said extreme ends thereof to have a rail receiving spacing from each other across said plane which is substantially greater than the spacing between said extreme ends of the jaws, said head defining an opening registering with one longitudinal end of said slot and having a size equal to the maximum transverse size of the slot to provide for free movement of said tongues through said last-mentioned opening into and out of said slot by translation longitudinally with respect to the slot, and clamping means on said head positioned to apply pressure to said tongues when the latter are disposed within said slot.

2. A fitting for releasably connecting the medial portion of a rail to an adjacent structural part, comprising, in combination, a head having a connector integral therewith and extending rigidly from one end thereof, said head defining therein an elongated slot extending thereacross between two arms rigid with the head and forming integral parts thereof, one longitudinal side of said slot being open along the length thereof away from said connector, a pair of opposed rail embracing jaws having two opposed tongues integrally formed on the respective jaws and shaped to fit slidably into said slot in opposed relation to each other, substantially every portion of one tongue and the opposing portion of the other tongue having a combined transverse thickness substantially equal to the corresponding transverse width of the slot, means forming a pivotal connection between each of said jaws and the adjacent arm thus providing for angular adjustment of said jaws relative to said head in planes parallel to said slot, said respective jaws including two rail gripping portions integral with said respective tongues and projecting from said open longitudinal side of said slot, said rail gripping portions projecting from said slot opposing each other across a plane parallel to the slot and having rail embracing extreme ends curving toward each other, said rail gripping portions being shaped inwardly of said extreme ends thereof to have a rail receiving spacing from each other across said last-mentioned plane which is substantially greater than the spacing between said extreme ends of the jaws, said head defining an opening registering with one longitudinal end of said slot and having a size equal to the maximum transverse size of the slot to provide for free movement of said tongues through said last-mentioned opening into and out of said slot by translation longitudinally with respect to the slot, and clamping means on said head positioned to apply pressure to said tongues when the latter are disposed within said slot.

3. For connecting the medial portion of a rail to an adjacent structural part, the combination of a connecting head including two arms integral therewith and projecting rigidly from one end thereof in spaced opposed relation to each other to define therebetween a slot extending transversely across the head, said slot being open away from said head along one entire longitudinal side of the slot, said respective arms defining two generally flat surfaces opposing each other across said slot and inclined toward each other from the bottom of the slot toward said open longitudinal side thereof, a structural part connector integral with said head and projecting rigidly from an end thereof generally opposite from said slot, said head defining an opening into said slot directly registering with one longitudinal end of said slot and having a size at least equal to that of the maximum transverse size of the slot as viewed from either longitudinal end thereof, a pair of rail embracing jaws disposed in opposing relation to each other across a plane parallel to said slot and including two opposing tongues integrally formed on the respective jaws and shaped to fit into said slot when moved thereinto through said opening at said one end thereof by translation longitudinally with respect to the slot, the ends of said tongues adjacent the bottom of said slot having a combined thickness which exceeds the width of the slot at said open longitudinal side thereof, said respective tongues defining substantially flat surfaces thereon opposing said respective arms and inclined to fit flat against said respective arm surfaces at opposite sides of the slot, retaining means on said head coacting with said tongues when the latter are disposed within said slot to restrain said tongues against movement from said slot through said opening at one end thereof, and said jaws projecting from said open longitudinal side of said slot in opposing spaced relation to each other across said plane and having outer ends curving toward each other.

4. For connecting the medial portion of a rail to an adjacent end of a hollow structural part disposed at a substantial angle to the rail, the combination of a connecting head including two arms integral therewith and projecting rigidly from one end thereof in spaced opposed relation to each other to define therebetween a slot extending transversely across the head, said slot being open away from said head along one entire longitudinal side of the slot, said respective arms defining two surfaces opposing each other across said slot and inclined toward each other from the bottom of the slot toward said open longitudinal side thereof, a connecting dowel integral with said head and projecting rigidly from an end thereof generally opposite from said slot, said head defining openings from opposite ends of said slot registering directly with the slot as viewed from either end and having a size respectively which is equal to the maximum transverse size of the slot, a pair of rail embracing jaws disposed in opposing relation to each other across a plane parallel to said slot and including two tongues integrally formed on the respective jaws and shaped to fit into said slot when moved thereinto through one of said end openings into the slot by translation longitudinally with respect to the slot, said tongues having a thickness adjacent the bottom of said slot which exceeds the width of the slot at said open longitudinal side thereof, retaining means on said head positioned to apply clamping pressure to said tongues when the latter are disposed within said slot, and said jaws projecting from said open longitudinal side of said slot in opposing spaced relation to each other across said plane and having outer ends curving toward each other but terminating short of each other when said tongues are clamped in said slot.

5. A separable rail connection comprising, in combination, an elongated rail, a hollow cylindrical member disposed at a sharp angle to said rail and having one end spaced a short distance from an intermediate portion of the rail, a connecting head, a connecting dowel integral with said head and projecting from one end thereof into the rail end of said cylindrical member, said dowel defining in the exterior surface thereof received within said cylindrical member a series of circumferentially spaced depressions, each of said depressions being elongated circumferentially with respect to the dowel and having only a very limited circumferential extent around the dowel, the portions of said hollow cylindrical member immediately adjacent said respective depressions being deformed toward said dowel to lock into the depressions, said head including two arms integral therewith and projecting rigidly therefrom toward said rail on opposite sides of a plane parallel to the rail to define between the arms a slot open along one longitudinal side toward the rail, two opposing jaws having respectively two gripping portions engaging opposite sides of said rail to embrace the major portion of the circumference thereof, said jaws including two opposed tongues integrally formed on said respective jaws and extending into said slot, said head defining an opening into one end of said slot, said opening registering directly with said slot as the latter is viewed from one end, said opening having a size equal to the maximum transverse size of said slot to provide clearance for movement of said tongues through said opening into and out of said slot by translation parallel to said rail, and restraining means mounted on said head in coacting relation to said tongues to restrain the latter in said slot against movement parallel to said rail.

6. A separable rail connection comprising, in combination, an elongated rail, a hollow cylindrical member disposed at a sharp angle to said rail and having one end spaced a short distance from an intermediate portion of the rail, a connecting head, a connecting dowel integral with said head and projecting from one end thereof into the rail end of said cylindrical member, said head including two arms integral therewith and projecting rigidly therefrom toward said rail on opposite sides of a plane parallel to the rail to define between the arms a slot open along one longitudinal side toward the rail, two opposing jaws having respectively two gripping portions engaging opposite sides of said rail to embrace the major portion of the circumference thereof, said jaws including two tongues integrally formed on said respective jaws and extending into said slot, said head defining an opening into one end of said slot, said opening registering directly with said slot as the latter is viewed from one end, said end opening having a size equal to the maximum transverse size of said slot to provide clearance for movement of said tongues through said end opening into and out of said slot by translation parallel to said rail, and clamping means on said head coacting with said tongues to clamp the latter in said slot against movement parallel to said rail.

References Cited in the file of this patent

UNITED STATES PATENTS

| | | | |
|---|---|---|---|
| 470,514 | Simpson | | Mar. 8, 1892 |
| 666,236 | Portor et al. | | Jan. 15, 1901 |
| 702,704 | Carll | | June 17, 1902 |
| 1,013,187 | Lofton et al. | | Jan. 2, 1912 |
| 1,322,801 | Lewis | | Nov. 25, 1919 |
| 2,164,846 | Thompson | | July 4, 1939 |